(No Model.) 3 Sheets—Sheet 1.
J. P. COBB.
MACHINE FOR SETTING AND SHARPENING SAWS.
No. 354,691. Patented Dec. 21, 1886.
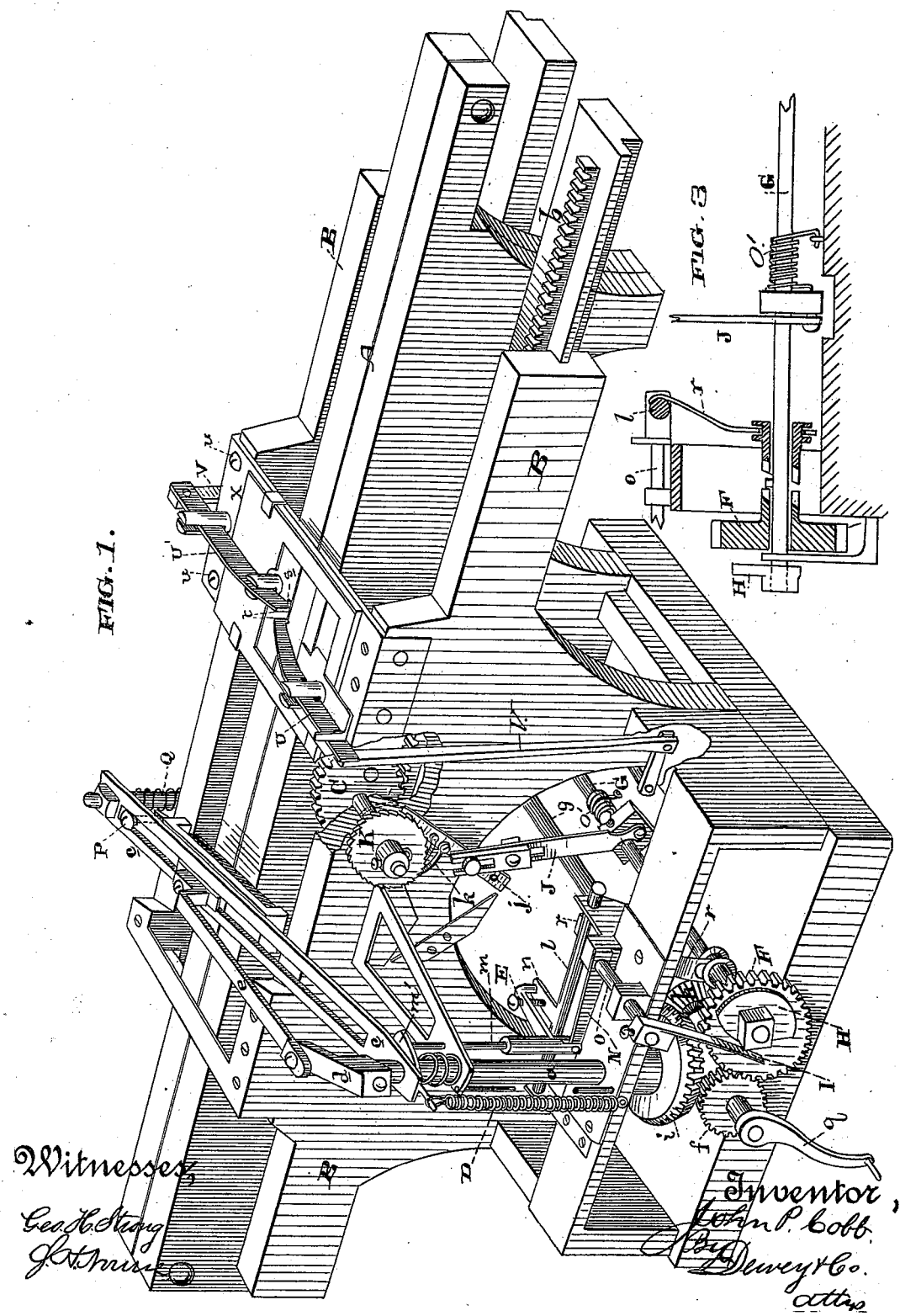

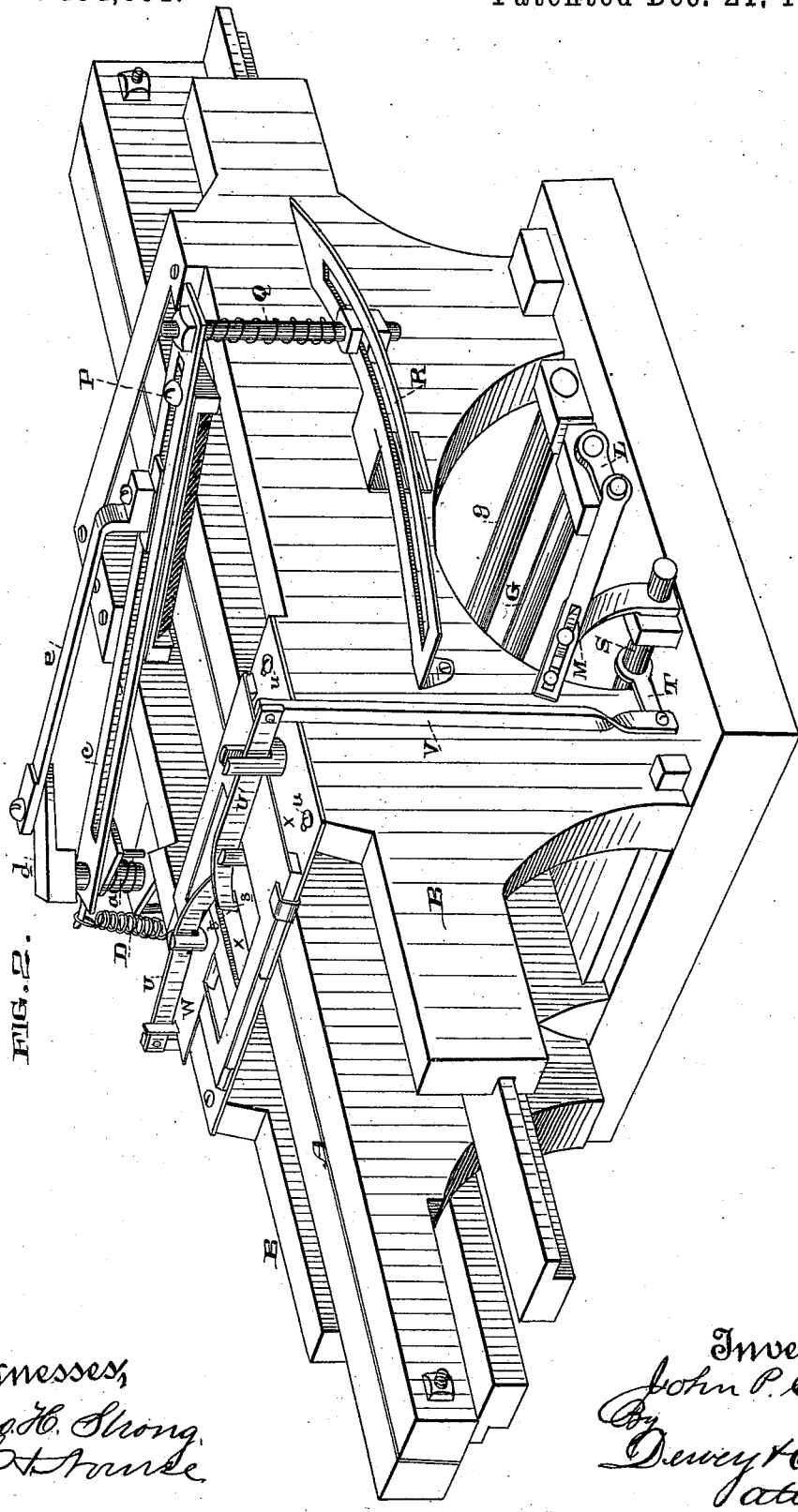

(No Model.) 3 Sheets—Sheet 3.
J. P. COBB.
MACHINE FOR SETTING AND SHARPENING SAWS.
No. 354,691. Patented Dec. 21, 1886.
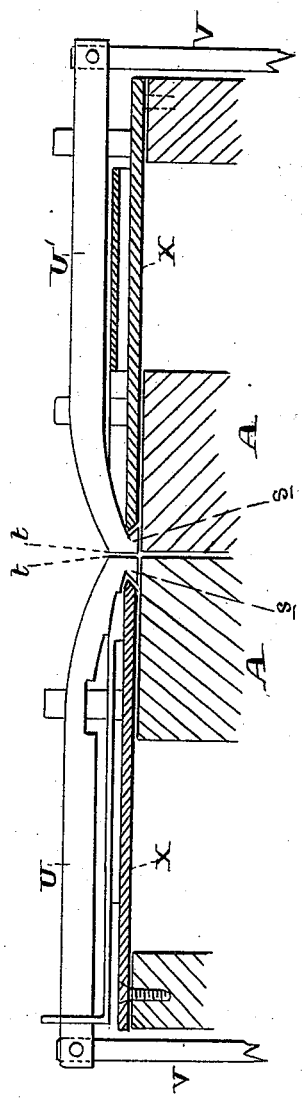
Witnesses,
Geo. H. Strong.
J. H. Rouse.
Inventor,
John P. Cobb.
By Dewey & Co.
Att'ys

UNITED STATES PATENT OFFICE.

JOHN P. COBB, OF COLLEGE CITY, CALIFORNIA.

MACHINE FOR SETTING AND SHARPENING SAWS.

SPECIFICATION forming part of Letters Patent No. 354,691, dated December 21, 1886.

Application filed December 19, 1885. Serial No. 186,219. (No model.)

*To all whom it may concern:*

Be it known that I, JOHN P. COBB, of College City, Colusa county, State of California, have invented an Improvement in Saw Filing and Setting Machines; and I hereby declare the following to be a full, clear, and exact description of the same.

My invention relates to an apparatus for filing and setting saws.

It consists of a holder for the saw-blade, with a carriage over which it is advanced intermittently a distance equal to the space between the teeth of the saw to be operated upon, a file suitably supported, and a means for adjusting it to the proper angle to move it across the line of the teeth of the saw, and a mechanism by which the teeth are set, all of which will be more fully explained by reference to the accompanying drawings, in which—

Figure 1 is a perspective view of my apparatus. Fig. 2 is a perspective view of the opposite side of the apparatus. Fig. 3 is a detail sectional view showing the shaft G, gear F, and connections. Fig. 4 is a detail view illustrating the levers U U'.

A A are a pair of jaws upon a carriage of suitable length, between which the saw-blade is secured by holding-screws at either end, the teeth of the saw being presented above the surface of the holder. The carriage is fitted to run in grooves in a guide-frame, B, and has a rack, $b$, fixed to it, so as to engage with a pinion, C. The shaft of this pinion extends through the side of the frame B, and upon the outer end is fixed a ratchet-wheel, K. This ratchet-wheel is engaged by pawls $k$ upon a lever-arm, $j$, which has its fulcrum upon the shaft of the ratchet-wheel.

The long arm of the lever extends out to one side, and, being provided with holes into which the pin from the pitman J may be introduced, the amount of stroke given this lever, and the consequent movement of the ratchet, and through it the pinion, the rack, and the saw-blade, will be dependent upon the distance from the fulcrum at which this pitman is connected with the lever, thus determining the number of teeth that the ratchet-wheel will be advanced at each stroke.

The lower end of the pitman J is connected with an arm or crank upon the shaft G, and when this shaft is connected with a gear-wheel, F, by a clutch, to be hereinafter described, it will make a partial revolution, thus causing the crank-arm to move the pitman J, and through it the lever $j$, pawls and ratchet-wheel, and thus the carriage and clamp holding the saw will be advanced a distance equal to the space between two teeth. The gear-wheel F is driven by a pinion, $f$, upon the shaft $g$, and upon this same shaft is fixed a beveled gear-wheel, $h$, which engages a similar wheel, $i$, upon the vertical shaft $a$. From the upper portion of this vertical shaft a slotted guide, $c$, extends across the machine above the saw, its opposite end being connected with a vertical rod or standard, Q, the lower end of which is adjustable by a set-screw in a slotted arc, R. The file is carried by a traveler moving in this slotted guide $c$, and is held in its supports by means of a set-screw, P. This screw is designed to bear against the shank of the file, whereby, when it is desired to adjust the file to present a new cutting-surface, the screw is loosened and the file turned, after which said file may be securely held in its new adjustment by simply tightening up the screw. The file is caused to travel across the teeth of the saw by means of a crank, $d$, upon the top of the vertical shaft $a$, which is connected with the file-carrier by a pitman, $e$. The angle which the file makes with the saw-blade in traveling across it is determined by the position of the vertical rod Q with relation to the vertical shaft $a$, the adjustment being made, as before described, by means of the arc R.

The end of the guide $c$ which fits around the vertical shaft $a$ slides freely up or down upon the shaft, and it is drawn down by a spring, D, attached to said guide, so as to keep the file in contact with the teeth of the saw while it is traveling in one direction.

The depth to which the file cuts is regulated by an adjustable gage-screw, E, which rests upon an arm, $n$, projecting from a horizontal shaft, $l$, and this shaft has an arm, $r$, projecting downward, so as to operate the clutch mechanism by which the gear-wheel F is connected with the shaft G.

The arm or rod $m$ extends upward, and is fixed in a plate beneath the horizontal file-guide $c$, and when this rod is lifted the file-guide and the file are also raised. This operation is produced by a lever, N, which projects from a shaft, o, and engages with the rod or arm carrying the screw E. This shaft o has an arm, I, extending down from it to a point where it may be engaged by a cam, H, upon the end of the shaft G, and when the cam engages with this arm it raises the file-guide and at the same time releases the mechanism which operates the clutch, and allows the latter to become disengaged from the pinion, while the file is also raised to move back across the saw.

The operation will then be as follows: By turning the crank $q$ the spring D draws the file-guide and file down until the gage-screw E touches the arm, and thus through shaft and its second arm, $r$, causes the clutch to engage with the loose gear F, thus causing the shaft G to rotate, and the cam H coming in contact with the arm I will raise the file. The pitman J at the same time will operate the ratchet K, causing the carriage A to move forward to bring the next tooth in position. When the crank which actuates the pitman J passes the center the carriage stops. At this instant the crank on the outer end of the shaft G draws forward the slotted bar M, and this partially rotates the horizontal shaft S by means of the crank-arm T. The set-levers U U' are operated from this shaft by means of connecting rods or pitmen V. The lower inner ends of the set-levers have projections $s$, which engage the edges of the plate $x$, through which the saw-teeth project, and as the outer edges of the levers are raised the ends $t$ press the two adjacent teeth in opposite directions. The plate $x$ is set to admit any thickness of saw by screws $u$. The plate W is moved transversely upon $x$, to adjust its lever U with reference to U', so as to fit any size of teeth which are presented.

The amount of set is regulated to suit the various sizes of teeth by moving the stop in the slot in the bar M.

The cam H is so constructed as to hold the file clear of the saw until the set mechanism is operated, then the cam on the loose gear F disengages the clutch and the coil-spring O' causes the shaft G to revolve backward to its former position. This completes the operation of setting and filing one tooth, the same being repeated at each forward movement of the saw until the work is entirely finished.

The mechanism described will not cause the clutch to engage with the loose wheel F until the file has reached the depth for which it was set, and this causes all the teeth to be filed to an equal depth.

I intend to use two files, the second one being operated by the same vertical shaft $a$ and driven by the same wrist-pin and crank $d$.

In order to operate a second file, a second guide, $c$, would extend at an angle across the frame A, the ends of said guide meeting at the shaft $a$ and diverging from that point. The second file-holder would be operated by a second pitman, which would be connected with the same crank $d$ with the first one, the two holders carrying the files being moved simultaneously and at a divergent angle.

The two files can be so set as to file the saw completely by passing it once through the machine.

Having thus described my invention, what I claim as new, and desire to secure by Letters Patent, is—

1. In a saw filing and setting apparatus, the saw carriage or holder traveling in guides having a toothed rack fixed to them, in combination with a gear-wheel engaging said rack, a ratchet-wheel upon the shaft of the gear-wheel, a lever-arm with pawls, and a pitman connected with said lever, and an operating arm or crank upon the counter-shaft, whereby the pawls actuate the ratchet and advance the carriage, substantially as herein described.

2. The saw-supporting carriage, the guides having a rack fixed to them, and mechanism, substantially as described, operated by a crank-shaft beneath the guides, by which the carriage is advanced intermittently, a file and guide frame extending across the apparatus above the saw, in combination with a vertical shaft, and a crank and pitman, whereby the file is moved across the saw, substantially as herein described.

3. In combination with the driving-shaft $g$, the parallel counter-shaft G, having a loose gear, F, engaging with a pinion upon the driving-shaft, and a clutch mechanism whereby said gear may be caused to engage and drive its shaft intermittently, and a coil-spring, O, by which the shaft is returned to its first position after being released from the clutch, substantially as herein described.

4. The file-guide having one end fitted loosely to the vertical shaft $a$, having a crank-arm by which the file is reciprocated, a spring by which this end of the guide is drawn downward, in combination with an arm or rod having a gage-screw, E, fixed to it, a lever by which the clutch mechanism is thrown into gear, and a second lever and shaft actuated by a cam, H, upon the end of the shaft G, whereby the file-guide is raised and the gage-screw is also raised to release the clutch mechanism, substantially as herein described.

5. The combination of a slotted file-guide, a vertical shaft having a crank-arm secured thereto, a pitman, the supporting-post Q, engaging one end of the guide, and the curved slotted arc R, in which said post is adjusted, all constructed and arranged to operate substantially as herein described.

6. The combination of the horizontal shaft G, having a crank-arm, T, and returning-spring O, the clutch mechanism by which it is intermittently connected so as to be rotated, the gear-wheel F, the slotted arm M, and the pitman connecting with the setting-arms, substantially as herein described.

7. The setting arms or levers provided with projections S, and inner ends adapted to press the two adjacent teeth of a centrally-held saw in opposite directions when the outer ends of the levers are raised, substantially as herein described.

8. The adjustable plates W and $x$ with guides, in combination with setting-levers formed to press two adjacent saw-teeth in opposite directions, and a mechanism to actuate said levers, substantially as herein described.

In witness whereof I have hereunto set my hand.

JOHN P. COBB.

Witnesses:
JOHN H. HARPHAUR,
P. S. MOORE.